US009198208B2

(12) United States Patent
Pape et al.

(10) Patent No.: US 9,198,208 B2
(45) Date of Patent: Nov. 24, 2015

(54) METHOD FOR CONTROLLING A NETWORK SYSTEM, NETWORK SYSTEM, AND COMPUTER PROGRAM

(75) Inventors: Andreas Pape, Brakel (DE); Juergen Weczerek, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 29 days.

(21) Appl. No.: 13/013,160

(22) Filed: Jan. 25, 2011

(65) Prior Publication Data

US 2011/0196952 A1 Aug. 11, 2011

(30) Foreign Application Priority Data

Feb. 10, 2010 (DE) .................... 10 2010 007 670

(51) Int. Cl.
*G06F 15/173* (2006.01)
*H04W 76/02* (2009.01)
(52) U.S. Cl.
CPC .................................. *H04W 76/022* (2013.01)
(58) Field of Classification Search
CPC ..... H04L 12/26; H04W 28/02; H04W 76/022
USPC ......... 709/220, 221, 222, 223, 226, 227, 230, 709/242, 249; 370/338, 395.31, 331, 392, 370/401, 503, 349, 474
See application file for complete search history.

(56) References Cited

U.S. PATENT DOCUMENTS

2002/0168980 A1* 11/2002 Gwon et al. .................. 455/437
2004/0042454 A1* 3/2004 Zabihi et al. .................. 370/392
2008/0019313 A1* 1/2008 Vogety .......................... 370/330
2008/0291928 A1* 11/2008 Tadimeti et al. .............. 370/401
2009/0052412 A1* 2/2009 Kumar et al. ................. 370/338

(Continued)

FOREIGN PATENT DOCUMENTS

| CN | 101018181 A | 8/2007 |
| DE | 102005053501 A1 | 5/2007 |
| EP | 2034779 A1 | 3/2009 |

OTHER PUBLICATIONS

Flexware Consortium, "FlexWARE Work Package 1, System Architecture Task 1.2, Architectural Design and Specification Deliverable 1.2", "Architecture Report. PNR 224350, Mar. 25, 2009",, Publisher: URL: http://www.iiss.oeaw.ac.atlflexware/documents/deliverables/d1 2.pdf.

(Continued)

*Primary Examiner* — Brian J Gillis
*Assistant Examiner* — Juan C Turriate Gastulo
(74) *Attorney, Agent, or Firm* — Kaplan Breyer Schwarz & Ottesen, LLP

(57) ABSTRACT

The invention relates to a method for controlling a network system, the network system including a wireless network to which a client is wirelessly connected, and a backbone network which is connected to the wireless network, having the following steps: (i) Establishing a tunnel between a client control device connected to the backbone network and the client for transmitting data between the client control device and the client, (ii) Sending status information from the client to the client control device via the tunnel, (iii) Evaluating the transmitted status information using the client control device, and (iv) Sending a control signal for controlling the client, which depends on the evaluated status information, from the client control device to the client via the tunnel. The invention further relates to a network system and a computer program.

8 Claims, 1 Drawing Sheet

(56) References Cited

U.S. PATENT DOCUMENTS

| | | | |
|---|---|---|---|
| 2009/0175260 | A1 | 7/2009 | Wang et al. |
| 2009/0222577 | A1* | 9/2009 | Goodman et al. ............ 709/238 |
| 2010/0095019 | A1* | 4/2010 | Hannel et al. ................. 709/232 |
| 2010/0309894 | A1* | 12/2010 | Csaszar et al. ................ 370/338 |
| 2011/0002220 | A1* | 1/2011 | Park et al. ..................... 370/230 |
| 2012/0014350 | A1* | 1/2012 | Kim et al. ..................... 370/331 |

OTHER PUBLICATIONS

"German Office Action for International Application No. 102010007670.8-31", Nov. 15, 2010, Publisher: German Patent Office, Published in: DE.

Flexware Consortium, "FlexWARE Work Package 1, System Architecture Task 1.2, Architectural Design and Specification Deliverable 1.2", "Architecture Report. PNR 224350, Document Preparation Date: Mar. 25, 2009", , Publisher: URL: http://www.iiss.oeaw.ac.atlflexware/documents/deliverables/d1 2.pdf.

"Related Chinese Patent Application No. 201110035691.5 Office Action", Sep. 2, 2013, Publisher: SIPO of PRC, Published in: CN.

"Related Chinese Patent Application No. 201110035691.5 Office Action", May 5, 2014, Publisher: SIPO of PRC, Published in: CN.

"Related European Patent Application No. EP 11 00 1026 Search Report", May 9, 2014, Publisher: EPO, Published in: EP.

* cited by examiner

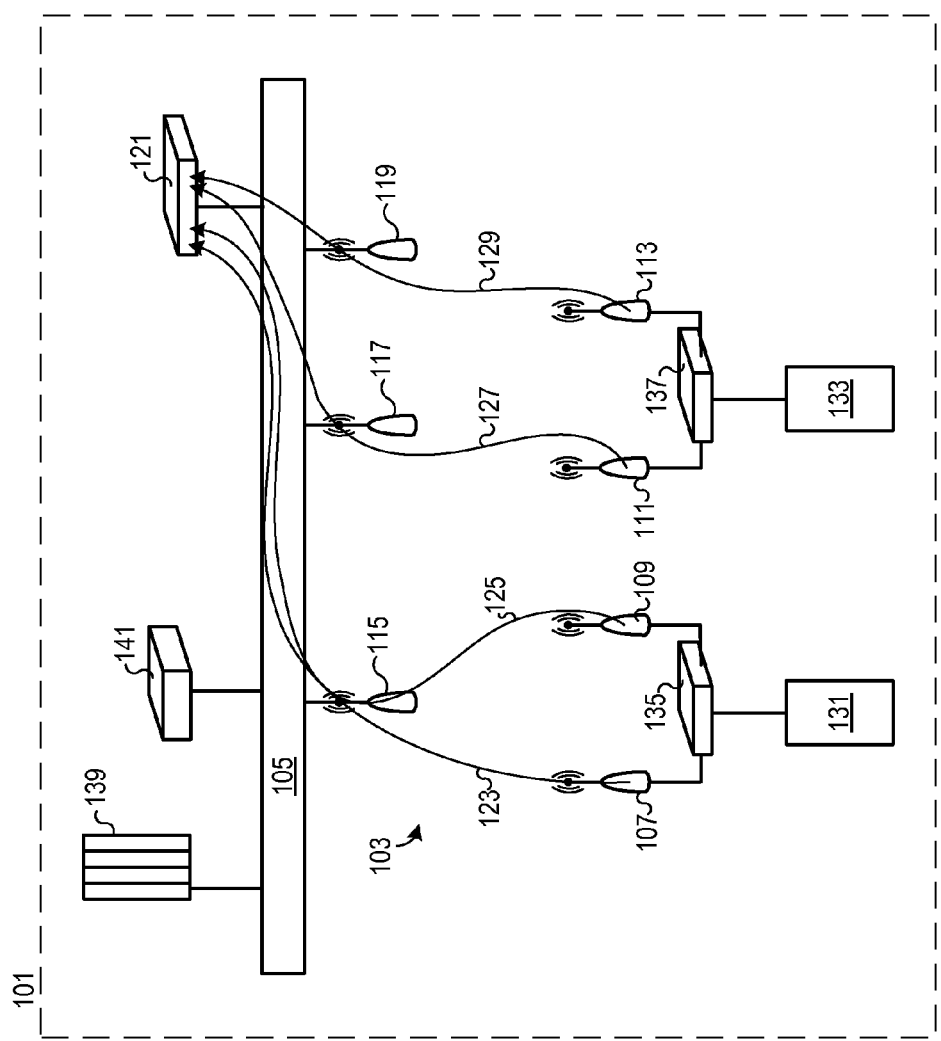

METHOD FOR CONTROLLING A NETWORK SYSTEM, NETWORK SYSTEM, AND COMPUTER PROGRAM

CROSS-REFERENCE TO RELATED APPLICATIONS

German patent application 10 2010 007 670.8, filed Feb. 10, 2010, is incorporated herein by reference.

FIELD OF INVENTION

The invention relates to a method for controlling a network system, a network system, and a computer program.

BACKGROUND OF THE INVENTION

In industrial automation networks, layer 2-transparent communication between devices connected to clients, for example input/out stations, drive devices, or cameras, and a control system in the network, downstream from a wireless network infrastructure, by means of access points is necessary. The term "layers" hereinafter refers to the layers of the Open Systems Interconnection (OSI) reference layer model of the International Organization for Standardization (ISO), in particular when a Profinet or similar real-time Ethernet system is involved. Since there is no unequivocal standard for the transparent layer 2 linkage of networks, each manufacturer of network devices has developed its own manufacturer-specific solution. However, this means that a customer is able to use only clients and access points from the same manufacturer.

A further disadvantage is that customary office WLAN systems provide no support at all for networks having clients to which devices are connected, due to the fact that in the customary office WLAN systems the clients are always regarded as end users of the communication (for example, notebooks or mobile telephones).

SUMMARY OF THE INVENTION

The object of the invention, therefore, is to provide a method for controlling a network system, and a network system, which overcome the above disadvantages and in particular allow transparent layer 2 linkage independent of the manufacturer.

Accordingly, a method for controlling a network system is provided, the network system including a wireless network to which a client is wirelessly connected, and a backbone network which is connected to the wireless network, having the following steps:
  Establishing a tunnel between a client control device connected to the backbone network and the client for transmitting data between the client control device and the client,
  Sending status information from the client to the client control device via the tunnel,
  Evaluating the transmitted status information using the client control device, and
  Sending a control signal for controlling the client, which depends on the evaluated status information, from the client control device to the client via the tunnel.
Accordingly, a network system is provided which has:
a client and a client control device,
wherein the client and the client control device include
  means for establishing a tunnel for transmitting data between the client and the client control device, and in each case include a transmitter for transmitting data and a receiver for receiving data, wherein the client has a detector for detecting status information, and the client control device has an evaluation device for evaluating the status information, and the evaluation device is also configured to generate control signals for controlling the client depending on the evaluated status information.

Furthermore, a computer program having program code for carrying out the method according to the invention is provided, the computer program being executed on a computer.

Thus, control of a client which is part of a wireless network advantageously takes place centrally by means of a client control device connected to the backbone network. The wireless network is connected to a backbone network. Such a client control device may also be referred to as a wireless client controller (WCC). The control is carried out depending on the evaluated status information, the status information having been transmitted beforehand from the client to the client control device via the established tunnel. Thus, the central control by means of the client control device advantageously allows multiple clients from different manufacturers to be connected in a wireless network. The wireless network may in particular be a WLAN or a Bluetooth network, it being also possible to use other wireless network transmission technologies.

The tunnel is advantageously established between the client control device and the client on the layer 3 level. For example, the tunnel may be a UDP/TCP tunnel, and the tunnel in particular is a VPN tunnel. The client advantageously communicates with the client control device via TCP/IP and/or UDP/IP. According to one preferred embodiment of the invention, a transmission protocol by means of which data are transmitted from the client to the client control device, and vice versa, includes point-to-point tunneling protocol (PPTP) and/or Internet Protocol Security (IPsec). The tunnel may also be referred to as a tunnel connection.

After the tunnel is established between the client control device and the client, the client sends status information to the client control device via the tunnel. The status information may be, for example, bit error rates, packet retransmissions, the number of visible access points of the wireless network, or received signal strength indication (RSSI) values. Status information may also preferably be sent from the client control device to the client. The transmitted status information is then evaluated using the client control device, which on the basis of the evaluated status information then makes decisions for coordination of the client, and is then able to appropriately control the client. For this purpose, a control signal which depends on the evaluated status information is sent to the client via the tunnel in order to control the client via the control signal. For example, a transmitting power of the client, a roaming threshold, a setup and termination of connection to access points, or the modulation types to be used may be controlled.

Control of the client using a client control device offers numerous advantages over the known prior art, as described in greater detail below.

In the prior art, a client must independently decide whether, and if so when, it changes to a more accessible access point, i.e., roams. In particular when multiple clients are connected to the wireless network, central coordination of all clients may be used to make an individual roaming decision for each client, and in particular to trigger individual roaming, due to the fact that at any point in time an accurate picture of the information of all clients is present over the entire application (RSSI values or packet error rates) and the entire wireless network. The detection of all relevant status information of the clients in the wireless network at a central location, namely, the client control device, thus represents an "online" site survey from the standpoint of a network user, and not from the standpoint of the access points, as is the case for customary control devices of a wireless network. The status data may also be referred to as client data. The customary control devices of a wireless network may be a WLAN network, for example, in particular a WLAN controller.

The network system may preferably also be linked to a customary control device for wireless networks, in particular a WLAN controller, so that for communication the client control device is linked to the control device for wireless networks, i.e., in particular to the WLAN controller. Such linking advantageously allows the client control device to relay changes, which are made by the control device for a wireless network, to the infrastructure of the wireless network, in particular to the WLAN access point infrastructure, also to the clients managed by the network, and thus can respond to dynamic changes in the wireless network. The changes may be a switch of channels or an adjustment of transmitting power, for example. In the prior art, such changes result in a significant alteration in the roaming behavior for the clients, since each client must then individually learn the new situation, for example due to a change in the coverage of the wireless network, in particular WLAN coverage, and adapt its roaming decisions. This is very time-consuming for each individual client, thus adversely affecting the real-time capability of the overall network system. The experience and knowledge of a client are immediately available to all other clients via the central coordination and control system according to the invention, using the client control device, since according to the invention, the client sends this status information to the client control device via the established tunnel. Thus, changes in the wireless network initiated by a control device for wireless networks may also be simultaneously provided to all clients. The invention thus advantageously allows a network system having real-time capability.

Another advantage of the invention is seen in customary WLAN infrastructures, in which a load distribution of clients on multiple access points is provided only via the configuration of the access points. The access points then decide whether other clients are permitted to log on to the wireless network, or how so-called Quality of Service (QoS) parameters are allocated for the WLAN communication. However, in this regard the access points have only limited knowledge concerning the actual application, i.e., which specific devices, for example cameras, input/output stations, or drive devices, are controlled. In this case the invention allows client-based load distribution (load balancing) by the fact that the clients centrally transmit status information to the client control device, which in this respect is more efficient because the clients are the actual load originators. In addition, the central coordination and control of the clients via the client control device allows significantly more application-based coordination of all users of the wireless network, in particular WLAN users, which in industrial applications such as materials handling technology, for example, is able to accept a much larger number of uniform device types.

The invention also allows interruption-free roaming, since the client control device is able to control the client in such a way that handover times of a client as the result of a new search for more accessible access points as well as authentication and association with an access point are avoided. Based on the knowledge of the client control device about the wireless network infrastructure, the client control device is able to send appropriate control signals to the client. The client control device in particular requires knowledge about the wireless network infrastructure based on the status information transmitted by the client and/or based on data transmitted to the client control device using a control device for wireless networks, for example a WLAN controller.

In one advantageous embodiment, it may be provided that the client control device transmits Ethernet telegrams and/or Ethernet packets between the client and the backbone network via the tunnel. In particular, the client control device bridges Ethernet telegrams and/or Ethernet packets from the clients and/or from the Ethernet users connected to the clients into the backbone network on ISO layer 2. The client control device preferably delivers telegrams, in particular Ethernet telegrams, from the backbone network via the tunnel to the clients and/or to the Ethernet users connected to the clients. The individual tunnel end points correspond to logically viewed bridge ports of a switch. Logically viewed, the client control device represents a switch having the tunnel end points as switch ports; in contrast to a customary switch, the client control device is able to resolve so-called loops, i.e., the particular clients that are linked to one another for roaming or redundancy reasons, for example, in particular on the Ethernet level, i.e., on the layer 2 level, and to efficiently use the information thus obtained for controlling the clients.

In another preferred embodiment of the invention, it may be provided that the data to be transmitted between the client control device and the client are transmitted cyclically. A cycle time may preferably be set using the client control device. However, it may also be provided that the cycle time is specified manually.

In another preferred embodiment of the invention, the client control device automatically optimizes the cycle time, in particular by taking into account the instantaneously available bandwidth of the wireless connection to the client. In another example of the embodiment of the invention, it may be provided that the cycle time is fixed via an automation application, for example the Profinet, wherein the client control device in particular adjusts a transmitting power or a roaming threshold in the client for ensuring the cycle time during operation.

According to another preferred embodiment of the invention, the data to be transmitted may be packed into a data frame. Such packing of data into a data frame is also referred to as packet aggregation. The data frame into which the data to be transmitted are packed may also be referred to as a tunnel frame. In particular, multiple Ethernet packets are packed into a data frame. Thus, multiple data items, in particular Ethernet packets, may be jointly transferred. By means of the packet aggregation according to the invention, low "jitter" is achieved in the communication between the client control device and the client and/or an Ethernet user or end user connected to the client, in particular when the data to be transmitted are transmitted cyclically between the client control device and the client, i.e., when the tunnel between the client control device and the client operates cyclically.

According to another example of an embodiment of the invention, a priority is assigned to the data to be transmitted, and the data are transmitted depending on their priority. The priority may in particular include a Quality of Service (QoS) parameter. Data having a high priority, i.e., high-priority packets, which in particular may be Ethernet packets, are preferentially transmitted as compared to low-priority packets, i.e., packets having a low priority. It may also be provided in particular that the high-priority and/or low-priority packets are transmitted in fragments. The high-priority packets may be Profinet packets, for example. The low-priority packets in particular are http packets or packets concerning a file download.

In another advantageous embodiment of the invention, it may be provided that at least one additional client is connected to the wireless network, and an additional tunnel is established between the client control device and the additional client for transmitting data between the client control device and the additional client. The additional client or the additional clients is/are also centrally controlled by the client control device, in that the client control device sends control signals for controlling these clients to the clients via the respective tunnel, the control signals being a function of evaluated status information which is sent from the particular clients to the client control device. A redundant network is thus advantageously provided. The client control device in particular makes the decision concerning which tunnel port is bridged and which is blocked, on the basis of the transmitted status information which may include, for example, diagnostic data of the particular client concerning the wireless network connection. In particular as the result of centrally detecting the data of the individual clients in the client control device and collecting and evaluating same, a central application-based load distribution, also referred to as load balancing, may be achieved for all clients over the entire wireless network structure. Thus, by use of the invention it is possible in particular to efficiently control a network having multiple clients. At this point it is noted that the above examples of embodiments of the invention which have been described as having only one client may also be carried out using multiple clients.

According to a another preferred embodiment of the invention, it may be provided that an end user is connected to the client and to the additional client for transmitting data between the end user and the backbone network via the two tunnels, the client control device enabling at least one of the two tunnels for transmission of data. The end user may preferably be an Ethernet user. For example, multiple end users and multiple clients may also be provided. The connection of an end user to multiple clients advantageously increases availability of an automated wireless application, since multiple redundant data channels are thus provided. When there is redundant wireless coverage, the clients are also preferably connected to multiple access points. In this regard, the client control device decides, on the basis of diagnostic data or quality data, which of the redundant tunnel connections is enabled for communication of the network downstream from the redundant clients and for the backbone network downstream from the access points. Depending on this decision, the client control device then sends appropriate control signals to the respective clients. The tunnel end points in the client control device correspond to logically viewed switch ports. The status information which is sent from the individual clients to the client control device via the tunnel may preferably include received signal strength indication (RSSI) values, so that the client control device is able to evaluate information concerning the infrastructure of the wireless network, for example wireless coverage. The client control device preferably includes means for a central client-side online site survey.

In one example of an embodiment of the network system according to the invention, the client includes means for modifying a switching table of a switch. Thus, in the event of a switchover of a tunnel for roaming or redundancy reasons, the switch may be forced to modify its switching table or tables. This may be achieved, for example, by a temporary link-down of the client whose tunnel port has been closed by the client control device for bridging into the backbone network.

In another preferred embodiment of the network system according to the invention, the client includes connection means for connecting the client to a network, in particular a wireless network such as a WLAN or Bluetooth network, for example. However, the network may also be a cabled network. The network may also preferably be a backbone network. In one example of the embodiment, the connection means may connect the client to the backbone network as well as to another cabled network and/or another wireless network. According to another preferred embodiment of the invention, the client control device may include corresponding connection means, similarly as for the client, for connecting the client control device to a network. The client is preferably connected to a wireless network, in particular to a WLAN or Bluetooth network, the wireless network being connected to a backbone network and the client control device likewise being connected to the backbone network. The backbone network may in particular include cableless and/or additional cabled networks. According to another example of the embodiment of the invention, a programmable logic controller (PLC) and/or an end user is/are connected to the backbone network.

According to one example of an embodiment of the computer program according to the invention, the computer program is implemented as firmware of the client and/or of the client control device.

BRIEF DESCRIPTION OF THE DRAWINGS

The invention is explained in greater detail below based on exemplary embodiments, with reference to one FIGURE.

FIG. 1 illustrates a network system 101 according to an embodiment of the invention.

DETAILED DESCRIPTION

FIG. 1 shows a network system 101 according to one exemplary embodiment of the invention. The network system 101 includes a wireless network 103 which is connected to a backbone network 105. The wireless network 103 includes multiple clients 107, 109, 111, and 113. The clients 107, 109, 111, 113 are connected to the backbone network 105 via multiple access points 115, 117, and 119. A client control device 121 is also connected to the backbone network 105. Although it is not shown here, more than three access points may also be provided. In another embodiment of the invention which is not shown, fewer than three access points may also be provided.

A tunnel 123, 125, 127, and 129 is respectively established between clients 107, 109, 111, and 113 and the client control device 121. Data may be transmitted between the corresponding clients 107, 109, 111, 113 and the client control device 121 via tunnels 123, 125, 127, and 129. The tunnels 123, 125, 127, and 129 may also be referred to as tunnel connections.

An end user 131 is connected to clients 107 and 109, and an end user 133 is connected to clients 111 and 113. End user 131 is connected via a switch 135 to clients 107 and 109, and end user 133 is connected via a switch 137 to clients 111 and 113. Thus, each end user 131 and 133 is redundantly connected to the client control device 121 via two tunnel connections 123 and 125, and 127 and 129, respectively. Although it is not shown here, in another preferred exemplary embodiment of the invention even further clients may be provided at the switch 135 or 137, so that more than two redundant tunnel connections may be established between the end user 131 or 133. In addition, in an exemplary embodiment which is not shown it may be provided that multiple end users are connected to one switch. It may also be provided that an end user is connected to more than one switch.

Tunnel connections 123 and 125 extend via access point 115 to the client control device 121; tunnel 127 extends via access point 117 to the client control device 121, and tunnel 129 extends via access point 119 to the client control device 121.

A programmable logic controller (PLC) device 139 and an additional end user 141 are also connected to the backbone network 105.

The client control device 121 receives the status information which is sent from clients 107, 109, 111, and 113. For example, the status information may include stability of the wireless connection between clients 107, 109, 111, and 113 and access points 115, 117, and 119. Based on this information, the client control device 121 may enable or block the individual tunnels. For example, if client 107 signals to the client control device 121 that a wireless connection between client 107 and access point 115 is unstable, the client control device 121 will block tunnel 123 and instead enable tunnel 125 for transmission of data between the end user 131 and the backbone network 105.

Clients 107, 109, 111, 113 may also transmit to the client control device 121, for example, status information concerning wireless coverage of the wireless network 103, so that, based on an evaluation of this transmitted status information, the client control device 121 has knowledge of the network infrastructure. Thus, the client control device 121 knows that access point 117 is situated at a farther distance from client 113 than is access point 119. The client control device may then send control signals to client 113 so that client 113 either increases its transmitting power or roams on access point 117. In particular when client 113 is roaming on access point 117, the client control device 121 blocks tunnel 129 so that no further data are sent via tunnel 129, and instead are sent via tunnel 127. This ensures in particular that a data connection always exists between end user 133 and the client control device 121. In the prior art, it would be possible for client 113 to roam on access point 117 at the exact time when tunnel 127 is not open, thus entailing the risk that data could be lost. However, by use of the invention such data loss is advantageously prevented, in particular by the fact that the client control device 121 centrally controls and coordinates clients 107, 109, 111, 113.

REFERENCE NUMERALS

101 Network system
103 Wireless network
105 Backbone network
107, 109, 111, 113 Clients
115, 117, 119 Access points
121 Client control device
123, 125, 127, 129 Tunnels
131, 133 End users
135, 137 Switch
139 PLC device
141 Additional end user

What is claimed is:

1. A method for controlling a network system, the network system including a wireless network to which a client is wirelessly connected, a backbone network that is directly connected to the wireless network, and a client control device connected to the backbone network, the method having the following steps:
    establishing a tunnel, which is a packet data connection based on a tunneling protocol, between the client control device and the client via the backbone network for transmitting data between the client control device and the client, wherein the client control device transmits Ethernet telegrams and/or Ethernet packets between the client and the backbone network via the tunnel, such that the client control device bridges Ethernet telegrams and/or Ethernet packets from the client into the backbone network and the client control device delivers Ethernet telegrams from the backbone network via the tunnel to the client, and wherein the client control device logically represents a switch having an end point of the tunnel as switch port;
    transmitting status information from the client to the client control device through the tunnel via the backbone network;
    evaluating the transmitted status information using the client control device, wherein the client control device on the basis of the evaluated status information makes decisions for coordination of the client; and
    transmitting a control signal for controlling the client, which depends on the evaluated status information, from the client control device to the client through the tunnel via the backbone network;
    wherein a transmitting power of the client, a roaming threshold, or the modulation types to be used are controlled via the transmitted control signal; and
    wherein at least one additional client is connected to the wireless network, and an additional tunnel is established between the client control device and the additional client for transmitting data between the client control device and the additional client.

2. The method according to claim 1, wherein the data to be transmitted between the client control device and the client are transmitted cyclically.

3. The method according to claim 2, wherein a cycle time is set using the client control device.

4. The method according to claim 1, wherein the data to be transmitted are packed into a data frame.

5. The method according to claim 1, wherein the data to be transmitted are assigned a priority, and the data are transmitted depending on their priority.

6. The method according to claim 1, wherein an end user is connected to the client and to the additional client for transmitting data between the end user and the backbone network via the two tunnels, the client control device enabling at least one of the two tunnels for transmission of data.

7. A network system, having:
    a wireless network to which a client is wirelessly connected, wherein at least one additional client is connected to the wireless network;
    a backbone network which is directly connected to the wireless network; and
    a client control device connected to the backbone network, the client control device being connected to the wireless network via the backbone network;
    wherein the client and the client control device include means for establishing a tunnel, which is a packet data connection based on a tunneling protocol, for transmitting data between the client and the client control device, and in each case include a transmitter for transmitting data and a receiver for receiving data; and wherein the additional client and the client control device include means for establishing an additional tunnel for transmitting data between the additional client and the client control device;

wherein the client control device is adapted to transmit Ethernet telegrams and/or Ethernet packets between the client and the backbone network via the tunnel, such that the client control device bridges Ethernet telegrams and/or Ethernet packets from the client into the backbone network and the client control device delivers Ethernet telegrams from the backbone network via the tunnel to the client;

wherein the client control device logically represents a switch having an end point of the tunnel as switch port;

wherein the client has a detector for detecting status information, and the client control device has an evaluation device for evaluating the status information;

wherein the client control device is adapted to make decisions for coordination of the client on the basis of the evaluated status information;

wherein the evaluation device is configured to generate control signals for controlling the client depending on the evaluated status information; and wherein a transmitting power of the client, a roaming threshold, or the modulation types to be used are controlled via the control signals.

8. A non-transitory computer-readable medium having computer program code for carrying out the method according to claim 1 when the computer program code is executed by a computer.

* * * * *